Dec. 19, 1944.   A. J. PETZINGER   2,365,588
ELECTRICAL MEASURING DEVICE
Filed Jan. 28, 1942
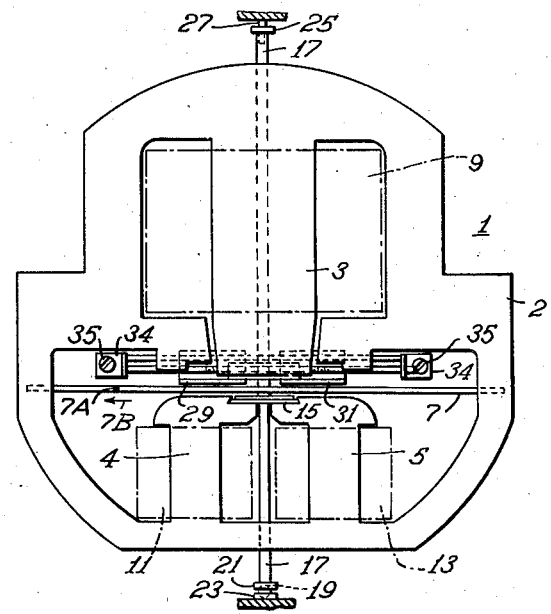
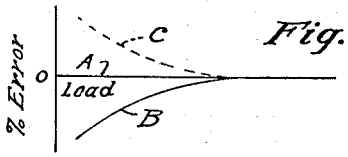
WITNESSES:
Edward Michaels
C. L. Freedman
INVENTOR
Ambrose J. Petzinger.
BY
ATTORNEY Patented Dec. 19, 1944

2,365,588

UNITED STATES PATENT OFFICE 2,365,588

ELECTRICAL MEASURING DEVICE

Ambrose J. Petzinger, Paterson, N. J., assignor to Westinghouse Electric & Manufacturing Company, East Pittsburgh, Pa., a corporation of Pennsylvania Application January 28, 1942, Serial No. 428,493

6 Claims. (Cl. 171—264)

This invention relates to measuring devices, and it has particular relation to measuring devices having movable parts for measuring variable electrical quantities. For the purpose of discussion measuring devices of the induction watthour meter type will be discussed.

The modern induction watthour meter provides accurate registration for a large range of load variation. This accuracy is obtained in part by the provision of certain temperature compensations which compensate for variations with temperature of the resistance and permeability of the materials employed in the watthour meter.

The induction watthour meter includes an armature structure which is mounted for rotation in suitable bearings. It has been found desirable to employ a suitable lubricant such as petrolatum for the top bearing of the induction watthour meter. This lubricant not only serves to decrease wear of the bearing, but it serves additionally to cushion the armature structure against vibration and to lessen the noise caused by chatter of the bearing. Although the lubricant tends to decrease the wear of the associated bearing, some friction nevertheless remains. This friction produces a retarding force which opposes rotation of the armature structure. If this retarding force were constant, it would be a simple matter to provide suitable compensation therefor. However, it so happens that the retarding force varies in magnitude as a function of temperature. This variation is aggravated by the present tendency of placing the induction watthour meter outdoors. When located outdoors, it is not uncommon for a watthour meter to be subjected to temperature varying from low temperatures, such as —20° C. to high temperatures such as 50° C. Such a variation in temperature results in a corresponding substantial variation in the retarding force produced by the lubricant.

The magnitude of the retarding force is relatively low compared to the full load rating of the induction watthour meter. For this reason, the effect of the retarding force on the accuracy of the watthour meter is not appreciable for the range corresponding to large loads. At light loads, however, the retarding force represents a substantial percentage of the driving torque applied to the armature structure. For this reason, the retarding force produced by the lubricant has a substantial effect on the light load accuracy of the watthour meter. For optimum accuracy of the watthour meter, it is desirable that suitable compensation be provided for this retarding force.

In accordance with the invention, an auxiliary force is produced which operates on the armature structure of a watthour meter in opposition to the retarding force. This auxiliary force may be produced by mounting in the air gap of a watthour meter a device for shading the voltage pole of the watthour meter. If this device has a high temperature coefficient of resistance and has suitable conductivity characteristics, the auxiliary force produced thereby may be designed to compensate for the retarding force produced by the lubricant over a substantial range of temperature variation.

Because of the difficulty in obtaining a single shading device having the desired characteristics, the invention contemplates further the provision of a plurality of shading devices which operate differentially with respect to the armature structure of a watthour meter. If these shading devices are provided with different temperature coefficients of resistance, a large auxiliary force may be produced thereby in response to a variation in temperature which is sufficient to compensate for the retarding force produced by the lubricant.

It is, therefore, an object of the invention to provide an electromotive device having temperature responsive shading means associated therewith.

It is another object of the invention to provide a watthour meter having differentially effective shading devices which have different temperature coefficients of resistance.

It is a still further object of the invention to provide an induction watthour meter having means compensating for temperature variations in the retarding force produced by the lubricant employed for the watthour meter bearings.

Other objects of the invention will be apparent from the following description taken in conjunction with the accompanying drawing, in which:

Figure 1 is a view in front elevation of a watthour meter embodying the invention, Fig. 2 is a graphical view illustrating characteristics of the watthour meter shown in Fig. 1, Fig. 3 is a detail view in perspective showing compensating means suitable for the watthour meter of Fig. 1, and Fig. 4 is a detail view in perspective showing a modified form of the compensating means illustrated in Fig. 3.

Referring to the drawing, Fig. 1 shows a watthour meter 1 having a magnetic core 2. This magnetic core includes a voltage pole 3 and current poles 4 and 5 which are spaced to define an air gap. An electroconductive armature or disk 7 is mounted for rotation in this air gap.

For energizing the watthour meter 1, the voltage pole 3 is surrounded by a voltage winding 9 and the current poles 4 and 5 are surrounded, respectively, by current windings 11 and 13. As well understood in the art when the windings 9, 11 and 13 are suitably energized in accordance with the voltage and current of an alternating current electrical circuit, a shifting magnetic field is produced in the air gap between the poles which is dependent upon the power flowing in the associated electrical circuit. In response to the shifting magnetic field, the armature disk 7 rotates to integrate the value of the energy flowing in the circuit. A magnetic shunt 15 may be positioned between the current poles 4 and 5 for providing overload compensation for the watthour meter. This shunt is designed to saturate or operate with decreasing magnetic permeability above a predetermined value of the current flowing through the windings 11 and 13. The construction of the watthour meter 1 thus far specifically described is well known in the art. A permanent magnet (not shown) is customarily provided for damping rotation of the disk 7.

For supporting the armature structure or disk 7, a shaft 17 is attached thereto in any suitable manner. This shaft may include at its lower end a suitable bearing which may be in the form of a steel ball 19 positioned between a sapphire cup 21 carried by the shaft 17, and a sapphire cup 23 carried by a fixed part of the watthour meter 1. At its upper end the shaft 17 may be provided with a bearing collar 25 having an opening for receiving a pin 27 which is attached to a fixed part of the watthour meter 1. A more detailed description of the bearings provided for the shaft 17 will be found in the Paszkowski Patent 1,728,507.

A bearing similar to that represented by the steel ball 19 provides excellent service without lubrication, and it is customary in the art to operate such a bearing dry. On the other hand, the upper bearing is customarily provided with a suitable lubricant, such as petrolatum. As previously pointed out, such a lubricant served not only to decrease wear but to decrease noise and vibration resulting from operation of the watthour meter. As also pointed out, the viscosity of the lubricant and the retarding force produced thereby which opposes rotation of the armature structure or disk 7 varies as a function of temperature. The direction of variation is such that the retarding force increases with a decrease in temperature of the watthour meter. Although this retarding force is a small percentage of the rated load of the watthour meter 1, it represents an appreciable percentage of the light loads which the watthour meter may be called upon to measure. Consequently, the accuracy of the watthour meter 1 at light loads may vary appreciably in accordance with temperature. This variation may be understood more clearly by reference to Fig. 2.

In Fig. 2, a graphical representation of the watthour meter characteristics is shown wherein abscissae represent the load measured by the watthour meter 1 and ordinates represent the percent error of registration of the watthour meter. The curve A represents the ideal registration curve of the watthour meter 1 and shows no error over the entire range of operation thereof. The effect of a decrease in temperature of the watthour meter 1 is represented by a second curve B which shows the appreciable increase in error of the watthour meter in the light load range of operation. As illustrated by the curve B, the effect of a decrease in temperature is to force the watthour meter disk 7 to rotate too slowly in the light load range.

In order to compensate for the error represented by the curve B, it is desirable to introduce an auxiliary force operating on the disk 7, as represented by the dotted curve C. If such an auxiliary force is added to the watthour meter 1, the error resulting from a decrease in temperature is substantially compensated and performance similar to that represented by the curve A is assured. To obtain this corrective auxiliary force, the voltage pole 3 of the watthour meter 1 is shaded by material having a suitable temperature coefficient of resistance.

As shown in Fig. 1, a shading device which may be in the form of an electrically conductive loop 29 is positioned beneath the pole face of the voltage pole 3. This loop 29 is so positioned that it aids the main shifting magnetic field produced by the windings 9, 11 and 13 to rotate the disk 7. If it is assumed that a mark 7A on the disk 7 rotates in the direction shown by the arrow 7B under the influence of the main shifting magnetic field, then the auxiliary force produced by the loop 29 also urges the disk 7 in the direction of the arrow 7B.

Let it be assumed first that the loop 29 is formed of an electroconductive material having a high positive temperature coefficient of resistance. As the temperature of the watthour meter 1 decreases, the retarding force produced by the bearing lubricant also increases. However, the auxiliary force produced by the loop 29 also increases because of the positive temperature coefficient thereof. Consequently if material were found having the desired characteristics, the loop 29 could be adjusted to compensate for the change in the retarding force resulting from a variation in temperature.

Because of the difficulty in obtaining the desired value of compensation from a single loop 29, the invention contemplates the provision of a second shading device, such as loop 31. This loop 31 is positioned to shade the voltage pole 3 and produces a force opposing rotation of the disk 7 in the direction of the arrow 7B. Consequently, the loops 29 and 31 are differentially effective relative to the armature structure or disk 7. These loops may be adjusted to a position wherein at a predetermined temperature the forces produced thereby are equal and opposite. If one of the loops has a lower temperature coefficient of resistance than the other of the loops, a variation from the predetermined temperature will produce a differential force acting on the disk 7. For example, let it be assumed that the loop 31 has a high positive temperature coefficient of resistance and the loop 29 has a low positive temperature coefficient of resistance or a negative temperature coefficient of resistance. With such a relationship of parts, a decrease in temperature below the predetermined temperature at which the shading effects of the loops 29 and 31 are equal and opposite produces a differential force acting to oppose rotation of the disk 7 in the direction of the arrow 7B. Since the loops 29 and 31 may be adjusted to produce equal and opposite forces acting on the disk 7 at a predetermined temperature, it follows that each loop may be positioned to cooperate with a substantial portion of the flux passing through the voltage pole 3 into the armature structure or disk 7. Consequently, a large differential force may be obtained in response to a deviation in temperature from such predetermined value.

As well understood in the prior art relating to induction meters and induction motors, if the shading coil or loop is positioned adjacent the face of a voltage pole, the loop causes the portion of the voltage magnetic flux passing therethrough to lag behind the remainder of the voltage magnetic flux. The resulting shifting magnetic field produces a force urging an adjacent electroconductive armature in the direction of displacement of the loop from its position of symmetry with respect to the pole face.

As viewed in Fig. 1, the loop 29 is displaced to the left relative to the pole face of the voltage pole 3. As above explained, the loop 29 cooperates with the voltage magnetic flux to produce a shifting magnetic field which develops a first force urging the disc 7 in the direction of the arrow 7B.

As viewed in Fig. 1, the loop 31 is displaced to the right relative to the pole face of the voltage pole 3. For the foregoing reasons, the loop 31 produces a shifting magnetic field which develops a second force urging the disc 7 in a direction opposite to the direction represented by the arrow 7B. The difference between these first and second forces represents a resultant auxiliary force which urges the disc 7 in the desired direction.

If the loops 29 and 31 have different temperature coefficients of resistance and are adjusted at a desired temperature to produce equal first and second forces, the resultant auxiliary force is zero at the desired temperature but increases in response to a change from the desired temperature which produces a difference in the resistances and effective shading actions of the two loops. The difference between two large quantities which vary from a condition of equality, is a large resultant quantity. Therefore, if the loops are adjusted to produce large equal and opposite forces acting in opposition at a desired temperature, a deviation from the desired temperature produces a substantial differential force acting on the disc 7. This force may be employed for compensating the previously discussed temperature errors.

In the present case, it is desired that the auxiliary force produced by the loops 29 and 31 be such as to assist in urging the armature structure or disk 7 in the direction of the arrow 7B. To this end, the loop 29 may be formed of a material having a higher temperature coefficient of resistance than that of the loop 31. For example, the loop 29 may have a large positive temperature coefficient of resistance and the loop 31 may have a smaller positive, a negative or substantially no temperature coefficient of resistance. The loops 29 and 31 are then adjusted to produce equal and opposite forces acting on the disk 7 at a predetermined temperature. A decrease in temperature will result in a force acting to urge the disk 7 in the direction of the arrow 7B. This force may be proportioned to compensate substantially for the effects of temperature variations on the lubricant employed for the watthour meter bearing. In a specific embodiment of the invention, the loop 29 may be formed of a material such as copper, whereas the loop 31 may be formed of a material such as phosphor bronze. A suitable construction for the loops and a mounting for the loops are shown in greater detail in Fig. 3.

Referring to Fig. 3, it will be observed that the loops 29 and 31 are suitably mounted on a pair of brackets 33 and 34 which may be attached in any suitable manner to a fixed part of the watthour meter 1, as by machine screws 35 (see Fig. 1). Although the loops 29 and 31 may be mounted in a fixed position selected to produce the required differential force, preferably either or both of the loops are adjustable. To this end, a rod 37 may be secured suitably to the brackets 33 and 34. Each of the loops is provided with a curved end 39 and 41, respectively, embracing the rod 37 and slidable therealong. The loop 29 has secured thereto in any suitable manner, a block 43 which has a threaded opening for receiving in threaded engagement therewith a screw threaded rod 45. The screw threaded rod 45 extends through the brackets 33 and 34 and is retained thereby against axial movement. For this purpose, the rod 45 may have one end 47 reduced in diameter and passed through an opening in the bracket 33. The reduced end then is upset to form a head 49 which prevents axial movement of the rod 45 but permits rotation thereof. In a similar manner, the loop 31 is provided with a block 51 which has a threaded opening for receiving in threaded engagement therewith a threaded sleeve 53. This threaded sleeve 53 surrounds the rod 45 and is retained against axial movement in any suitable manner, as by means of cotter pins 55 which pass through openings in the rod 45. From an inspection of Fig. 3, it will be observed that rotation of the rod 45, which may have a screw driver slot 57 for this purpose, adjusts the loop 29 relative to the voltage pole 3. Also rotation of the sleeve 53, which may have a knurled disk 59 to facilitate rotation thereof, adjusts the loop 31 relative to the voltage pole. Consequently, each of the loops is independently adjustable to provide the desired compensation for the watthour meter.

Although the watthour meter 1 may include a conventional light load adjustment device in addition to the structure thus far described, it will be appreciated that by suitable adjustment of the loops 29 and 31 the watthour meter 1 may be adjusted not only to compensate for the retarding force produced by the bearing lubricant but also to effect the customary light load adjustment of the watthour meter.

It is believed that the operation of the structure thus far described will be apparent from the foregoing description thereof. The loops 29 and 31 are adjusted at a predetermined temperature to compensate the watthour meter 1 for correct light load operation. If a greater or smaller differential force is required for compensation, the loops 29 and 31 may be adjusted to approach each other or to recede from each other, as required.

In Fig. 4, a somewhat modified form of the invention is illustrated. In the modification of Fig. 4, a pair of strips or plates of copper 29A and phosphor bronze 31A corresponds to the loops 29 and 31 of Fig. 3. These strips are provided with curved ends 39A and 41A which engage the rod 37. The rod 37 is attached to brackets 33A and 34A which corresponds to the brackets 33 and 34 of Figs. 1 and 3. The strips 29A and 31A both are secured to a common block 61 which has a threaded opening for receiving a threaded rod 45A. This threaded rod 45A corresponds to the rod 45 of Fig. 3 and may be similarly positioned in its brackets 33A and 34A. By inspection of Fig. 4, it will be observed that rotation of the rod 45A simultaneously adjusts both of the strips 29A and 31A relative to the voltage pole 3 when the assembly of Fig. 4 is mounted on the watthour meter 1 in place of that shown in Fig. 3.

It is believed that the operation of the structure shown in Fig. 4 is apparent from the description of the structure shown in detail in Fig. 3. It will be understood that the loop formation represented by the loops 29 and 31 illustrated in Fig. 3 and the plate formation, represented by the strips 29A and 31A illustrated in Fig. 4, are alternative forms of shading devices which may be employed.

In accordance with the principles of this invention, an induction motive structure may be provided with differentially operative shading devices which are responsive to a desired variable function for differentially affecting the movement of an associated armature structure. Depending on which of the shading devices has the higher temperature coefficient of resistance, a torque may be applied to an armature structure which increases or decreases with a decrease in temperature of the motive structure. Consequently if the materials employed in a motive structure and the design thereof result in an inherent error which decreases with a decrease in temperature, the shading devices of this invention may be designed to provide a corrective torque which decreases with a decrease in temperature. Since certain electromagnets because of materials or design have been found to exhibit such a decreasing error, the invention advantageously may be applied thereto.

Although the invention has been described with reference to specific embodiments thereof, numerous modifications are possible. Therefore, the invention is to be restricted only by the appended claims when interpreted in view of the prior art.

I claim as my invention:

1. In an induction meter for measuring a function of the voltage and current of an electrical circuit, a magnetic core having an air gap, current and voltage windings cooperating with said magnetic core and responsive when energized to the function to be measured for directing alternating magnetic flux into said air gap to establish a shifting magnetic field, an armature structure, means mounting said armature structure for rotation in said air gap in response to said shifting magnetic field, and adjusting means for said measuring device, said adjusting means comprising a first closed-circuit shading member positioned in the path of magnetic flux supplied to said air gap by said voltage winding for producing a torque component operating to urge said armature structure in a first direction of rotation, a second closed-circuit shading member positioned in the path of magnetic flux supplied to said air gap by said voltage winding for producing a torque component operating to urge said armature structure in a second direction of rotation, whereby said members differentially affect said armature structure, said members being formed of materials having electrical characteristics varying differently with a predetermined variable quantity for modifying rotation of said armature structure as a function of said predetermined variable quantity.

2. In an induction meter, a magnetic core having an air gap, voltage and current windings effective when energized from an alternating current circuit for directing separate alternating magnetic fluxes through said magnetic core into said air gap to establish a shifting magnetic field, an armature structure, means mounting said armature structure for rotation in said air gap in response to said shifting magnetic field, and adjusting means for said measuring device, said adjusting means comprising a first electroconductive closed-circuit shading member positioned in said air gap adjacent said armature structure in the path of magnetic flux supplied to said air gap by said voltage winding for producing a torque component operating to urge said armature structure in a first direction of rotation, a second electroconductive closed-circuit shading member positioned in said air gap adjacent said armature structure in the path of magnetic flux supplied to said air gap by said voltage winding for producing a torque component operating to urge said armature structure in a second direction of rotation, whereby said members differentially affect said armature structure, said members being formed of materials having electrical resistances varying differently with temperature.

3. In an induction watthour meter, a magnetic core having an air gap and having a voltage pole element providing a voltage pole face adjacent said air gap, means cooperating with said magnetic core and responsive to an electrical energy quantity to be measured for producing a shifting magnetic field in said air gap, said means including means for directing a voltage magnetic flux through said voltage pole element into said air gap, an electroconductive armature structure, means mounting said armature structure in said air gap for rotation under the influence of said shifting magnetic field, said mounting means including means opposing movement of said armature structure with a retarding force which varies as a function of temperature, and load adjusting means comprising a first closed-circuit electroconductive member positioned in said air gap for shading said voltage pole element to produce a torque component urging said armature structure in a first direction of rotation, a second closed-circuit electroconductive member positioned in said air gap for shading said voltage pole element to produce a torque component urging said armature structure in a second direction of rotation, whereby said electroconductive members differentially modify the rotation of said armature structure, said electroconductive members having different temperature coefficients of resistance proportioned to produce a differential force acting on said armature structure for compensating said watt-hour meter for errors introduced by said retarding force over a substantial range of temperature variation, and adjusting means for said electroconductive members for adjusting the torque components produced thereby.

4. In an electrical measuring device for measuring a variable electrical quantity, a magnetic structure having an air gap bordered by a pole face, means for directing through said magnetic structure including said pole face into said air gap an alternating magnetic flux for producing a shifting magnetic field in said air gap varying in accordance with a quantity to be measured, an electroconductive armature positioned in said air gap, means mounting said electroconductive armature for rotation in said air gap in a direction such that a point on said armature passes from a position adjacent an entering edge of said pole face towards a position adjacent a trailing edge of said pole face, a first closed-circuit electroconductive member positioned in said air gap adjacent said pole face to intercept and lag magnetic flux entering and leaving said air gap through a portion of said pole face nearer to the entering one of said edges, and a second closed-circuit electroconductive member positioned in said air gap adjacent said pole face to intercept and lag magnetic flux entering and leaving said air gap through a portion of said pole face nearer to the trailing one of said edges, said electroconductive members shading said pole face to apply to said armature a resultant torque which is the difference between two opposed component torques applied to said armature as a result of the shading actions of said respective electroconductive members, and said electroconductive members being responsive in different degrees to a predetermined function, whereby the resultant torque varies in accordance with said function.

5. In an electrical measuring device for measuring a variable electrical quantity, a magnetic structure having an air gap bordered by a pole face, means for directing through said magnetic structure including said pole face into said air gap an alternating magnetic flux for producing a shifting magnetic field in said air gap varying in accordance with a quantity to be measured, an electroconductive armature positioned in said air gap, means mounting said electroconductive armature for rotation in said air gap in a direction such that a point on said armature passes from a position adjacent an entering edge of said pole face towards a position adjacent a trailing edge of said pole face, a first closed-circuit electroconductive member positioned adjacent said pole face to intercept and lag magnetic flux entering and leaving said air gap through a portion of said pole face nearer to the entering one of said edges, and a second closed-circuit electroconductive member positioned adjacent said pole face to intercept and lag magnetic flux entering and leaving said air gap through a portion of said pole face nearer to the trailing one of said edges, said electroconductive members shading said pole face to apply to said armature a resultant torque which is the difference between two opposed component torques applied to said armature as a result of the shading actions of said respective electroconductive members, said electroconductive members having different temperature coefficients of resistance, whereby said resultant torque is a function of the temperature of the measuring device.

6. In an electrical measuring device for measuring a variable electrical quantity, a magnetic structure having an air gap bordered by a pole face, means for directing through said magnetic structure including said pole face into said air gap an alternating magnetic flux for producing a shifting magnetic field in said air gap varying in accordance with a quantity to be measured, an electroconductive armature positioned in said air gap, means mounting said electroconductive armature for rotation in said air gap in a direction such that a point on said armature passes from a position adjacent an entering edge of said pole face towards a position adjacent a trailing edge of said pole face, a first closed-circuit electroconductive member positioned adjacent said pole face to intercept and lag magnetic flux entering and leaving said air gap through a portion of said pole face nearer to the entering one of said edges, a second closed-circuit electroconductive member positioned adjacent said pole face to intercept and lag magnetic flux entering and leaving said air gap through a portion of said pole face nearer to the trailing one of said edges, said electroconductive members shading said pole face to apply to said armature a resultant torque which is the difference between two opposed component torques applied to said armature as a result of the shading actions of said respective electroconductive members, said electroconductive members having different temperature coefficients of resistance, whereby said resultant torque is a function of the temperature of the measuring device, and means for adjusting said electroconductive members to vary the shading action thereof on magnetic flux entering and leaving said pole face.

AMBROSE J. PETZINGER.